US010302833B2

(12) United States Patent
Nam et al.

(10) Patent No.: US 10,302,833 B2
(45) Date of Patent: May 28, 2019

(54) POLARIZER

(71) Applicant: LG CHEM, LTD., Seoul (KR)

(72) Inventors: Sung Hyun Nam, Daejeon (KR); Kyung Ki Hong, Daejeon (KR); Eung Jin Jang, Daejeon (KR); Yeong Rae Chang, Daejeon (KR); Heon Kim, Daejeon (KR); Kyun Il Rah, Daejeon (KR); Jong Hyun Jung, Daejeon (KR); Byung Sun Lee, Daejeon (KR); Hong Jun Choi, Daejeon (KR); Moon Soo Park, Daejeon (KR); Sun Kug Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/547,034

(22) PCT Filed: Feb. 1, 2016

(86) PCT No.: PCT/KR2016/001066
§ 371 (c)(1),
(2) Date: Jul. 27, 2017

(87) PCT Pub. No.: WO2016/122276
PCT Pub. Date: Aug. 4, 2016

(65) Prior Publication Data
US 2018/0017724 A1    Jan. 18, 2018

(30) Foreign Application Priority Data

Jan. 30, 2015  (KR) .................. 10-2015-0015477
Feb. 1, 2016   (KR) .................. 10-2016-0012170
Feb. 1, 2016   (KR) .................. 10-2016-0012172

(51) Int. Cl.
*G02F 1/1335*  (2006.01)
*G02B 5/30*    (2006.01)

(52) U.S. Cl.
CPC ......... *G02B 5/3066* (2013.01); *G02B 5/3033* (2013.01); *G02F 1/133528* (2013.01); *G02F 1/133533* (2013.01); *G02F 1/133553* (2013.01)

(58) Field of Classification Search
CPC ... G02F 1/133528; G02F 2001/133638; G02B 5/3033; G02B 5/3083; G02B 5/305;
(Continued)

(56) References Cited

U.S. PATENT DOCUMENTS 6,606,136 B2   8/2003  Matsumoto et al.
9,643,387 B2   5/2017  Nam et al.
(Continued)

FOREIGN PATENT DOCUMENTS

EP   2728388 A1   5/2014
EP   2983019 A1   2/2016
(Continued)

OTHER PUBLICATIONS

Wikipedia, the free encyclopedia: "Lab color space", XP002779086, https://en.wikipedia.org/wiki/Lab_color_space [retreived on Mar. 13, 2018].

*Primary Examiner* — Thoi V Duong
(74) *Attorney, Agent, or Firm* — Dentons US LLP

(57) ABSTRACT

The present application relates to a polarizer, a polarizing plate and a display device. The present application can provide a polarizer or a polarizing plate that is applied to various types of display devices, particularly to a display device having a highly reflective liquid crystal panel and that shows excellent characteristics. In addition, the present application can provide a display device including the polarizer or the polarizing plate.

13 Claims, 6 Drawing Sheets

(58) Field of Classification Search
CPC .......... G02B 5/3025; G02B 1/04; G02B 1/08; B32B 2457/202; B32B 2038/0028; B32B 2307/40; B32B 2307/42
See application file for complete search history.

(56) References Cited

U.S. PATENT DOCUMENTS

| | | | |
|---|---|---|---|
| 2004/0004777 A1* | 1/2004 | Takehisa | G02B 5/0808 359/883 |
| 2006/0028725 A1 | 2/2006 | Gerlach et al. | |
| 2011/0058131 A1* | 3/2011 | Ishiguro | G02F 1/133632 349/117 |
| 2012/0170117 A1 | 7/2012 | Cho et al. | |
| 2013/0010236 A1 | 1/2013 | Nam et al. | |
| 2013/0258250 A1* | 10/2013 | Jung | G02F 1/133528 349/65 |
| 2015/0219961 A1 | 8/2015 | Nam et al. | |

FOREIGN PATENT DOCUMENTS

| | | |
|---|---|---|
| JP | 2000-122093 A | 4/2000 |
| JP | 2000-162625 A | 6/2000 |
| JP | 2001-133765 A | 5/2001 |
| JP | 2002-169024 A | 6/2002 |
| JP | 2005-031577 A | 2/2005 |
| JP | 3870632 B2 | 1/2007 |
| JP | 2008509433 A | 3/2008 |
| JP | 2013525826 A | 6/2013 |
| KR | 10-2005-0007192 A | 1/2005 |
| KR | 10-2011-0104700 A | 9/2011 |
| KR | 10-1437139 B1 | 9/2014 |
| KR | 10-2015-0004015 A | 1/2015 |
| WO | 2014/017796 A1 | 1/2014 |
| WO | 2014/162633 A1 | 10/2014 |
| WO | 2014/204154 A1 | 12/2014 |

* cited by examiner

[Figure 1]
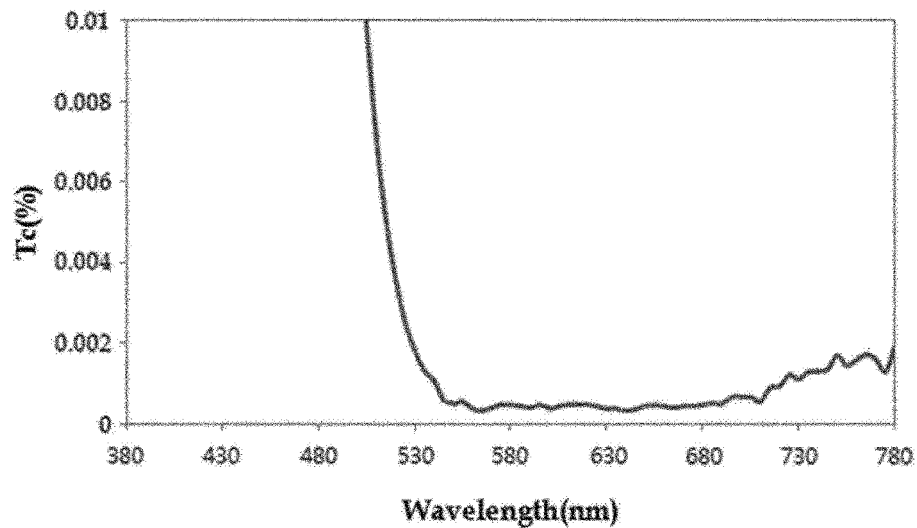
[Figure 2]
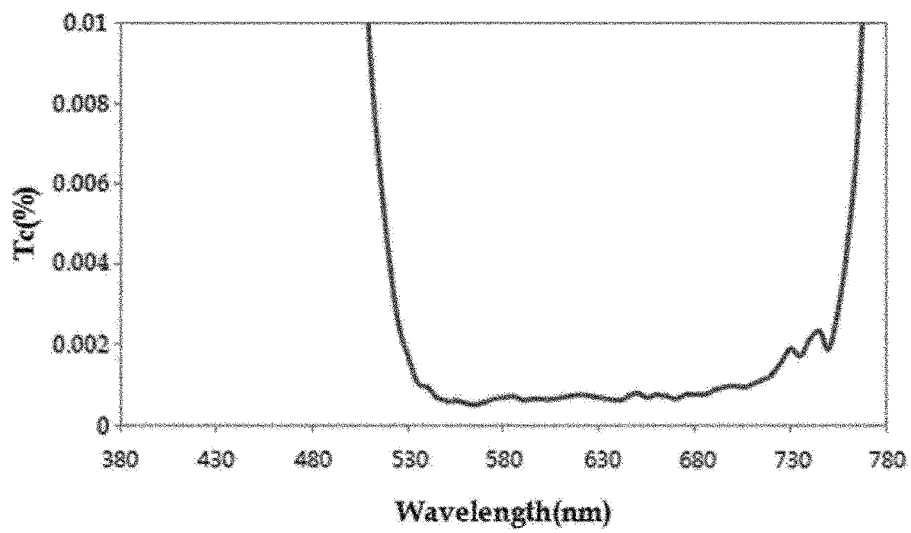

[Figure 3]
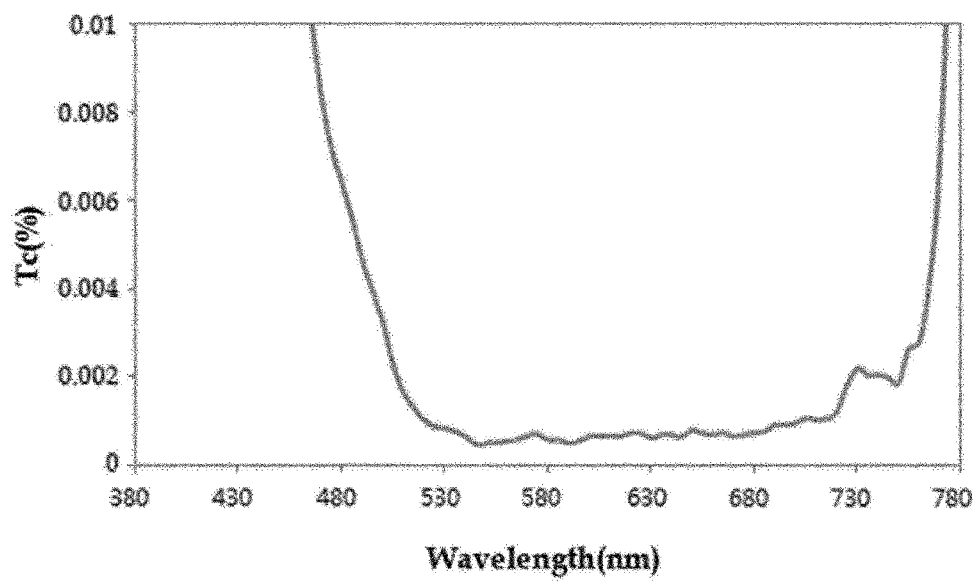
[Figure 4]
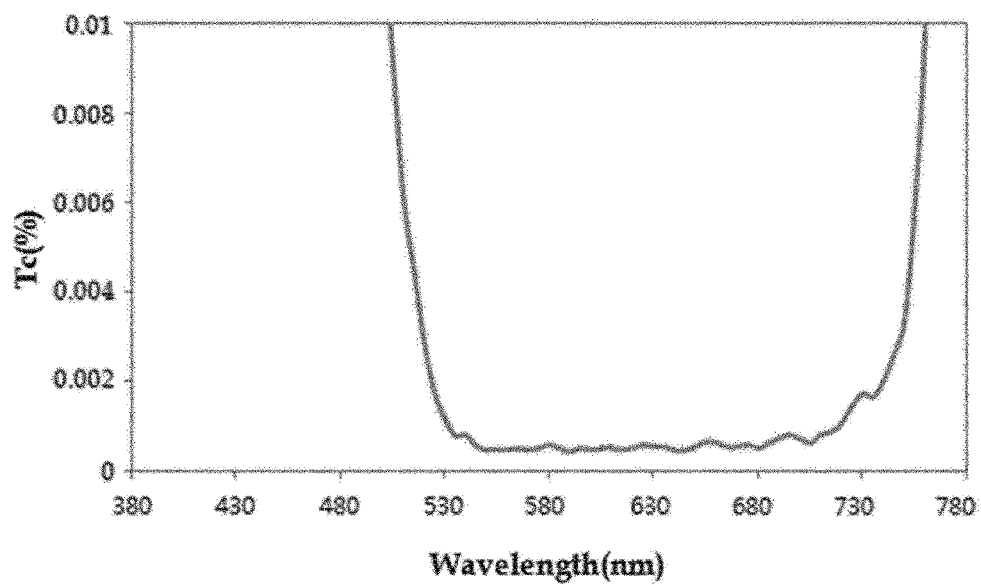

[Figure 5]
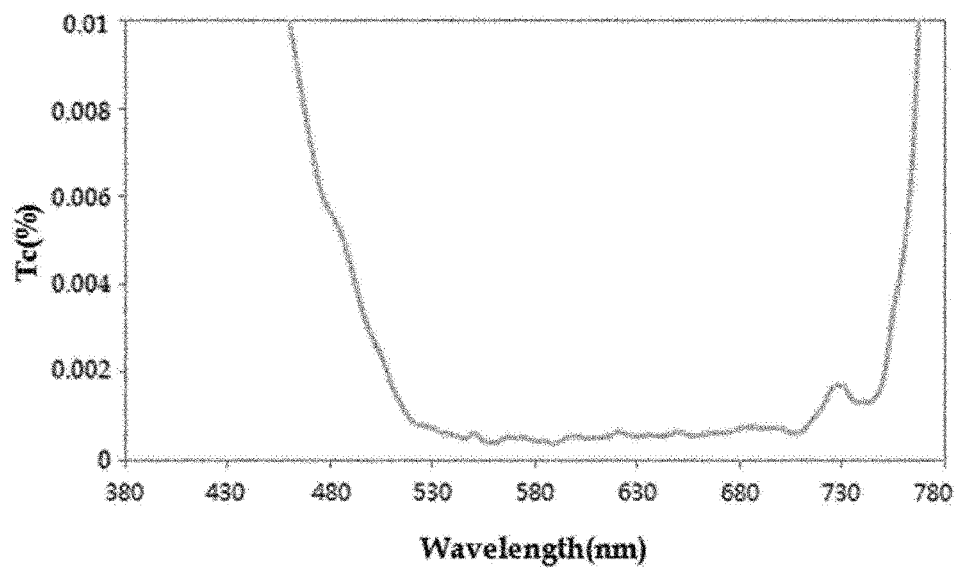
[Figure 6]
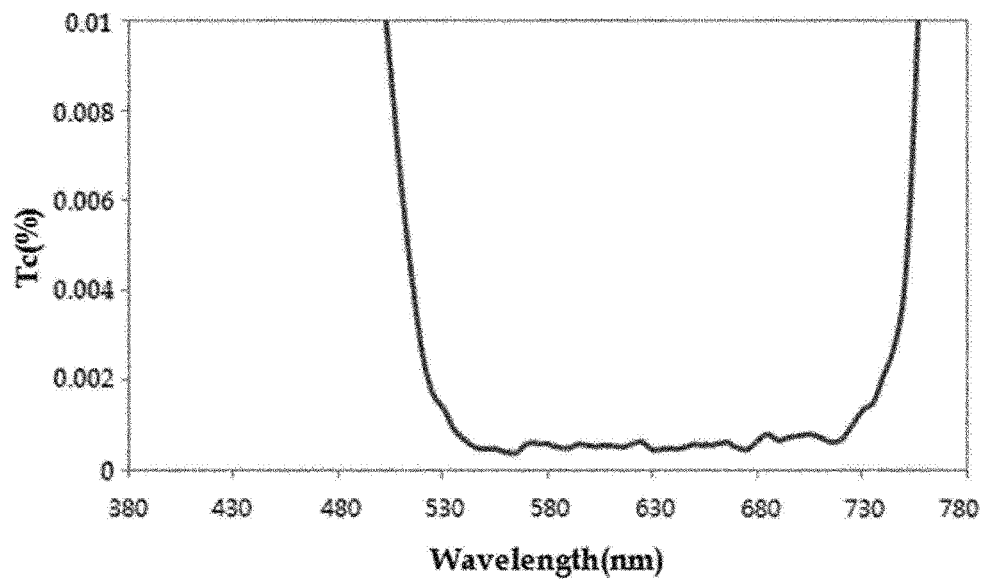

[Figure 7]
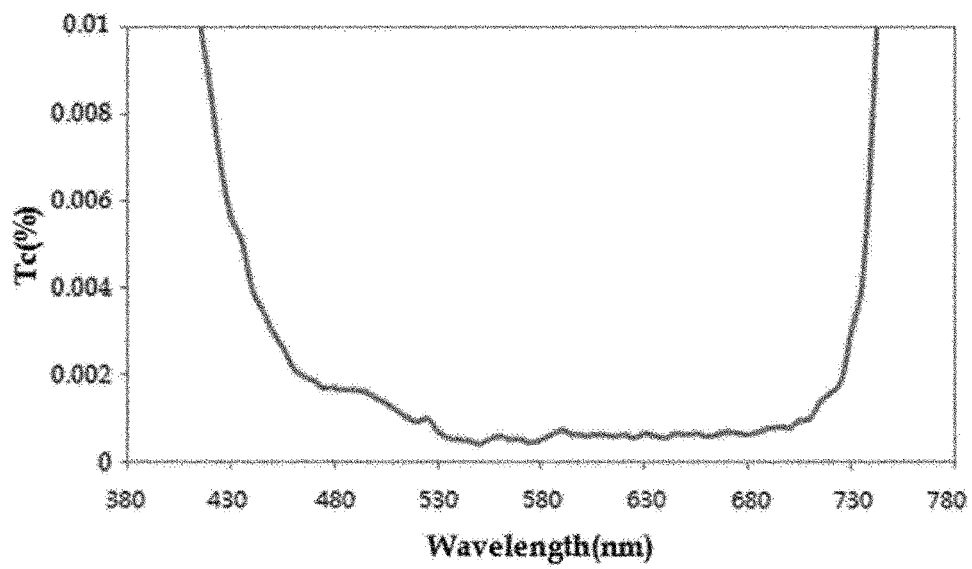
[Figure 8]
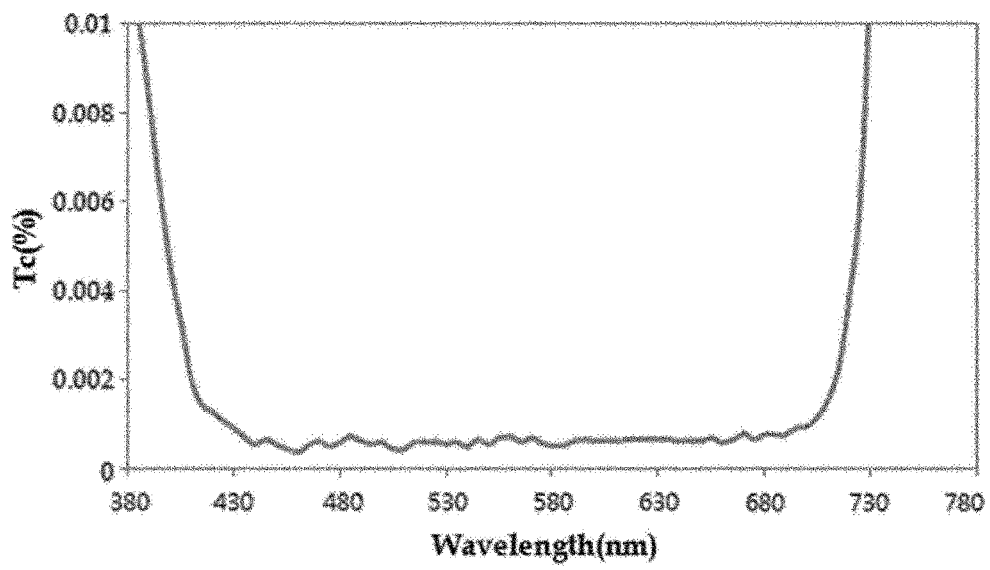

[Figure 9]
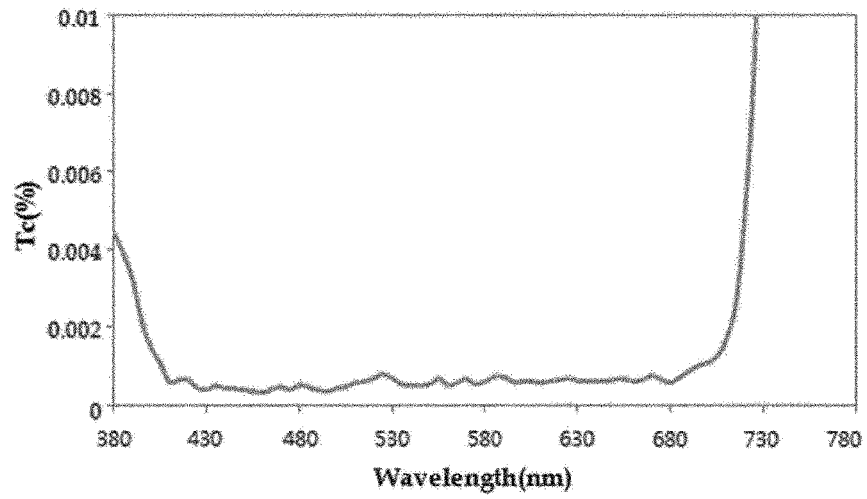
[Figure 10]
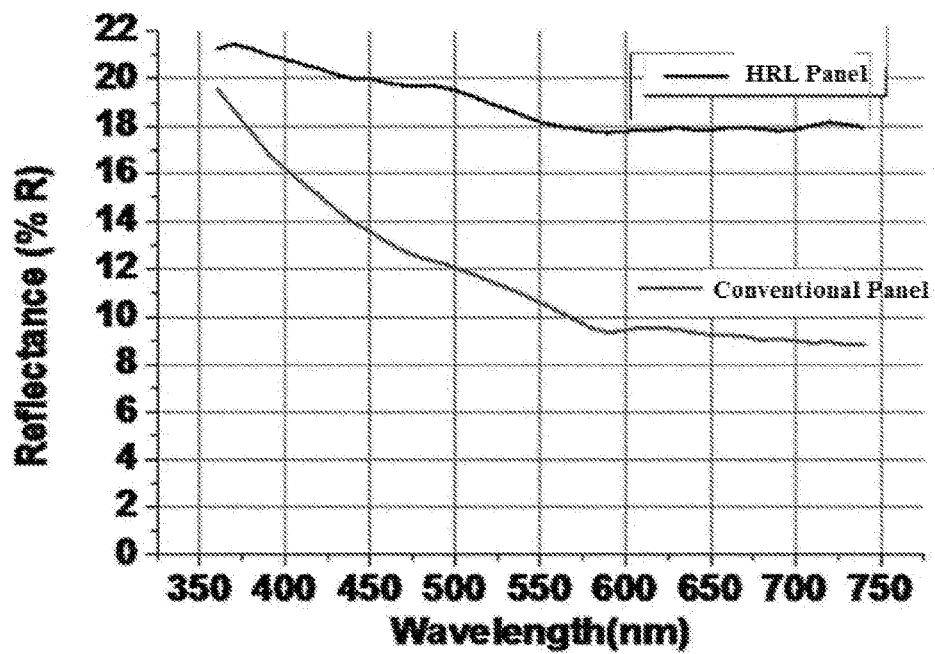

[Figure 11]
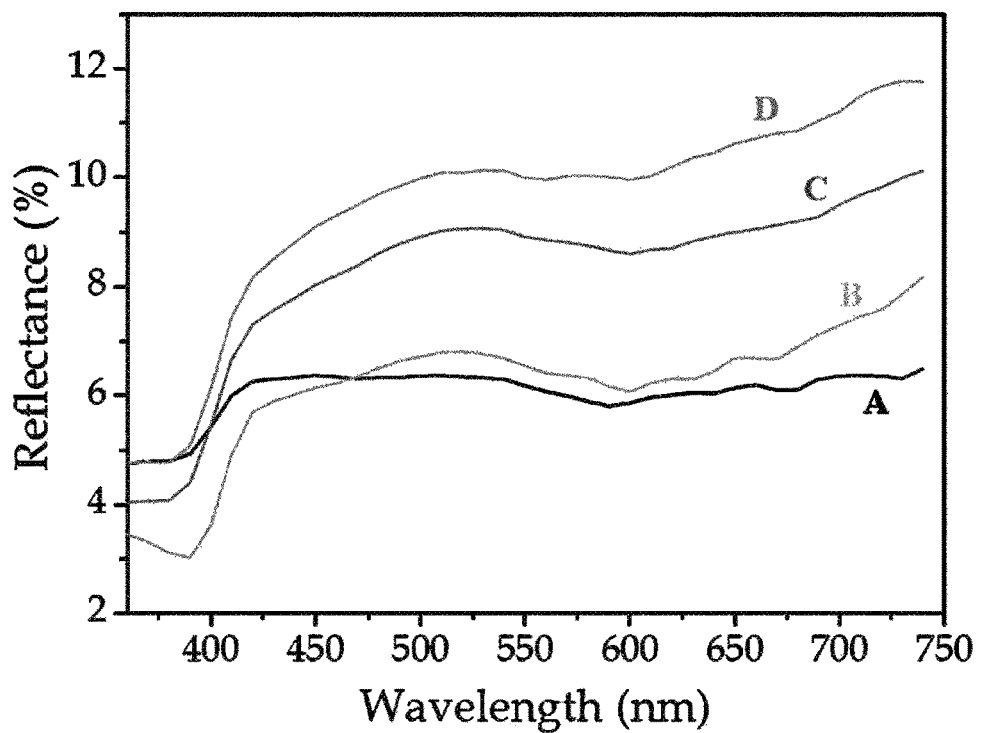

POLARIZER

TECHNICAL FIELD

This application is a National Stage Application of International Application No. PCT/KR2016/001066 filed on Feb. 1, 2016, which claims the benefit of Korean Patent Application No. 10-2015-0015477 filed on Jan. 30, 2015, Korean Patent Application No. 10-2016-0012170 filed on Feb. 1, 2016 and Korean Patent Application No. 10-2016-0012172 filed on Feb. 1, 2016, all of which are hereby incorporated by reference in their entirety for all purposes as if fully set forth herein.

The present application relates to a polarizer or a polarizing plate.

BACKGROUND ART

An LCD (Liquid Crystal Display) is a display device using the fact that a light transmittance varies according to arrangement of liquid crystals, which may display the desired color and image by controlling transmission of light emitted from a backlight according to voltages applied to the liquid crystals and passing it through a color filter.

Typically, the LCD is a display that liquid crystals are positioned between a lower substrate forming a TFT (Thin Film Transistor) and an upper substrate forming a color filter, and an electric signal is transmitted to the TFT to control the liquid crystals, and uses a polarizing plate to control transmission of light.

DISCLOSURE

Technical Problem

The present application provides a polarizing plate.

Technical Solution

The present application is directed to a polarizing plate comprising a polarizer. The term polarizer and polarizing plate herein have a different meaning. The term polarizer means a functional device exhibiting polarization function, such as, for example, a PVA (poly(vinyl alcohol))-based film, and the polarizing plate means a device comprising other elements together with the polarizer. Other elements included together with the polarizer may be exemplified by a protective film, an optical retardation film, an adhesive layer, a pressure-sensitive adhesive layer or a low reflection layer and the like, of the polarizer, without being limited thereto.

The polarizer of the present application may be a polarizer for a highly reflective liquid crystal panel. In the present application the term highly reflective liquid crystal panel may mean a liquid crystal panel having a reflectance of 12% or more, 14% or more, 16% or more, or 18% or more. Here, the reflectance is a reflectance to light having a wavelength of about 550 nm, and also a reflectance measured from the upper substrate side. The reflectance of the highly reflective liquid crystal panel may be, for example, 30% or less, 28% or less, 26% or less, 24% or less, 22% or less, or 20% or less.

In the present application the term upper substrate means, in a structure of a liquid crystal panel comprising liquid crystals interposed between two sheets of substrates, a substrate of the two sheets of substrates, closer to an observer to observe images displayed by the liquid crystal panel.

General liquid crystal panels comprise liquid crystals interposed between the upper substrate and the lower substrate. Here, a TFT (Thin Film Transistor) capable of applying an electric signal is present on the lower substrate and a color filter is present on the upper substrate, where the color filter comprises a so-called BM (Black Matrix). General liquid crystal panels usually show a reflectance of about 10% (on the basis of wavelength 550 nm), because the color filter comprising the BM blocking or absorbing light in the upper substrate is present on the upper substrate as above.

The highly reflective liquid crystal panel may have, for example, a structure comprising no BM, a structure that the color filter and the BM are not present on the upper substrate, but are present on the lower substrate, a structure that the color filter comprising no BM is present on the lower substrate, and the like, as compared with the conventional structure as described above. In one example, the highly reflective liquid crystal panel may be a panel that the color filter and the TFT are disposed together on the lower substrate, where the color filter may or may not comprise the BM. The increased reflectance of the highly reflective liquid crystal panel as above can affect a feeling of color in the display device, especially a feeling of color in a black state. Here, the term black state is a state controlled so that the liquid crystal panel blocks light from a light source, and for example, may mean a state of voltage off in a normally black mode or a state of voltage on in a normally white mode. In addition, in the case of the panel comprising no BM of highly reflective liquid crystal panels, a light leakage may be caused more largely by increase of an aperture ratio in the black state and the like and such a light leakage may allow for the feeling of color in the black state to be close to approximately red through yellow. The polarizer or polarizing plate of the present application has optical characteristics to be described below, and such an optical characteristic can maximize its advantages, while solving problems that may occur in the above highly reflective liquid crystal panels.

Accordingly, the highly reflective liquid crystal panel applied by the polarizer of the present application may be a liquid crystal panel comprising no BM or a liquid crystal panel that the color filter is not present on the upper substrate, but is present together with the TFT on the lower substrate. The liquid crystal panel comprising no BM may or may not comprise the color filter, and in the case of comprising the color filter, this color filter may be present on the lower substrate rather than the upper substrate. In addition, in the structure that the color filter and the TFT exist on the lower substrate at the same time, the color filter may or may not comprise the BM. The liquid crystal panel having such a structure, for example, the liquid crystal panel that the color filter is present on the lower substrate is advantageous for realizing various structures such as a curved surface structure, and if the BM does not exist, it is possible to be advantageous in terms of luminance.

Such a polarizer may be an upper polarizer of the liquid crystal panel. In the present application, the term upper may mean a direction to face an observer who observes images from a display device when the display device realizes images, and the term lower may mean a direction opposite to the above. The upper polarizer may also be referred to as a visible side polarizer in other words. In addition, in the present application the term lower polarizer may be also referred to as a back side polarizer or a light source side polarizer.

The polarizer or polarizing plate of the present application may have optically controlled characteristics. For example, the polarizer or polarizing plate may exhibit a range of coordinates in CIE (INTERNATIONAL COMMISSION ON ILLUMINATION) Lab color space. In one example the polarizer or polarizing plate may satisfy at least one condition of Conditions 1 to 4 as described below. That is, the present application the polarizer may satisfy any one condition of the following conditions 1 to 4 alone or the polarizing plate comprising the polarizer may comprise any one condition of the following conditions 1 to 4. In the conditions 1 to 4 as described below, any one condition does not have precedence over other conditions. In addition, when the polarizer or polarizing plate simultaneously satisfies two or more selected from the conditions as described below, the performance of the polarizer or polarizing plate can be more enhanced.

The CIE Lab color space is a color space in which the CIE XYZ color space is non-linearly transformed based on an antagonistic theory of human vision. In this color space, L value represents brightness, where if L value is 0, it represents black, while if L value is 100, it represents white. In addition, if a value is negative, the color is biased to green, while if it is positive, it is biased to red or purple. Also, if b value is negative, the color is biased to blue, while if b value is positive, it is biased to yellow.

As Condition 1, the polarizer or polarizing plate may have the −a value of, for example, about 2 or less, less than 2, 1.95 or less, 1.9 or less, less than 1.9, 1.85 or less, 1.8 or less, less than 1.8, 1.75 or less, 1.7 or less, less than 1.7, 1.65 or less, 1.6 or less, less than 1.6, 1.55 or less, 1.5 or less, or less than 1.5 in the CIE Lab color space. The −a value may be about 0.7 or more, 0.75 or more, 0.8 or more, 0.85 or more, about 0.9 or more, 0.95 or more, 1.0 or more, about 1.1 or more, about 1.3 or more, or about 1.4 or more.

As Condition 2, the polarizer or polarizing plate may have the b value of about 4 or less, about 3.5 or less, less than about 3.5, about 3 or less, less than about 3, about 2.5 or less, or less than about 2.5 in the CIE Lab color space. The b value may be about 1.5 or more, more than about 1.5, about 2 or more, or more than about 2.5.

As Condition 3, the polarizer or polarizing plate may have a ratio of the −a value and the b value (−b/a, hereinafter may be referred to as a C index) of about 2.5 or less, or less than about 2.5. The C index may be about 1 or more, more than about 1, about 1.25 or more, more than about 1.25, about 1.5 or more, or more than about 1.5.

As Condition 4, the polarizer or polarizing plate may have a $-b_c$ value of 40 or less in the CIE Lab color space. In another example, the $-b_c$ value may be 38 or less, 36 or less, 34 or less, 32 or less, 30 or less, 28 or less, 26 or less, 24 or less, 22 or less, 20 or less, 18 or less, 16 or less, 14 or less, 12 or less, 10 or less, 8 or less, 6 or less, 4 or less, 2 or less, 1 or less, or 0.5 or less. In another example, the $-b_c$ value may be 0.01 or more, 0.05 or more, 0.1 or more, 0.5 or more, 1 or more, 2 or more, 4 or more, 6 or more, 8 or more, 10 or more, 12 or more, 14 or more, 16 or more, 18 or more, 20 or more, 22 or more, 24 or more, or 26 or more. The $-b_c$ value may be in the range by a combination of any one of the above described upper limits and any one of the lower limits. The polarizer has a light absorption axis formed in one direction. Here, the $-b_c$ value may be a value multiplying the b value by −1 in the CIE Lab color space measured using the linearly polarized light polarized parallel to the absorption axis. That is, in conditions 1 to 2, the a value and b value may be the a value and b value measured for non-polarized light. The $b_c$ value can be measured in the same manner on measuring the b value, for example, in a state in which two sheets of polarizers or polarizing plates are formed for the light absorption axes to be vertical to each other.

The polarizer or polarizing plate may satisfy any one or two or more of the above conditions 1 to 4 or all the above conditions. Such a polarizer or polarizing plate may be applied to a liquid crystal panel, in particular, the above-described highly reflective liquid crystal panel to improve a disadvantage of the liquid crystal panel, for example visibility in the black state, while maintaining or maximizing its advantages. Although the reason is not clear, the polarizer having the above optical characteristics may block or absorb light having a long wavelength, for example, light of red to yellow series, of light from the liquid crystal panel, whereby visibility characteristics in the black state can be improved.

In one example the polarizer or polarizing plate may at least satisfy the condition 2 among the above conditions 1 to 4, and further satisfy the conditions 1 and/or 3. In another example the polarizer or polarizing plate may at least satisfy the condition 3, and further satisfy the conditions 1 and/or 2. In addition, in another example the polarizer or polarizing plate may satisfy all the above conditions 1 to 3. Furthermore, in another example the polarizer or polarizing plate may at least satisfy the above condition 4, and further satisfy one or more of the conditions 1 to 3.

For example, the polarizer or polarizing plate may at least satisfy the conditions 2 and 4, and further satisfy the conditions 1 and/or 3, or at least satisfy the conditions 3 and 4, and further satisfy the conditions 1 and/or 2, or satisfy all the above conditions 1 to 4.

Each value in the CIE Lab color space can be measured by applying a common way to measure each coordinate of the color space, and for example, can be measured according to the manufacturer's manual after positioning an equipment having an integrating sphere type detector (spectrophotometer) (ex. CM-2600d, KONICA MINOLTA, Inc.) at a measurement position. In one example each coordinate of the CIE Lab color space may be measured in a state of attaching the polarizer or polarizing plate to a liquid crystal panel, for example, the highly reflective liquid crystal panel, and may be measured for the polarizer or polarizing plate itself.

The polarizer or the polarizing plate can also satisfy other functions required for the polarizer or the polarizing plate, while showing the above-described optical characteristics.

For example, the polarizer or polarizing plate may have a transmittance (Ts) for non-polarized light of at least about 35% or at least about 40%. The transmittance (Ts) may be about 60% or less, about 55% or less, about 50% or less, or about 45% or less. The transmittance (Ts) may be, for example, a transmittance measured for one sheet of polarizer or polarizing plate.

In addition, the polarizer or polarizing plate has a light absorption axis and a light transmission axis orthogonal thereto, and may have a transmittance (Tc), for the linearly polarized light having an angle in a range of approximately −5 degrees to 5 degrees in respect to the light absorption axis, of about 0.01% or less, about 0.009% or less, about 0.006% or less, about 0.005% or less, about 0.004% or less, about 0.001% or less, or about 0.0009% or less. The transmittance (Tc) may be at least about 0.0001%. Here, the transmittance (Tc) may mean a transmittance (Tc) representing the minimum value of transmittance when transmittances are measured in a state that two sheets of polarizers or polarizing plates are overlapped, while scanning the overlapping state for each angle so that the light absorption axes of the respective polarizers or polarizing plates form an angle in a range from 0 degrees to 360 degrees. Here, at least one polarizer of the overlapped two sheets of polarizers or polarizing plates may be a polarizer or polarizing plate according to the present application and the other polarizer or polarizing plate may be a polarizer or polarizing plate according to the present application or another polarizer or polarizing plate, for example, a polarizer or polarizing plate equipped in the measuring equipment.

The polarizer or the polarizing plate may have a polarization degree of at least about 99.9% or at least about 99.99%. In the present application the polarization degree is a value calculated according to Equation 1 below.

$$\text{Polarization degree } (P) \text{ (\%)} = \{(Tp-Tc)/(Tp+Tc)\}^{1/2} \times 100 \quad \text{[Equation 1]}$$

In Equation 1 Tp is a transmittance of the polarizer for the linearly polarized light forming an angle of approximately 85 degrees to 95 degrees with the light absorption axis of the polarizer or polarizing plate, and Tc is a transmittance of the polarizer or polarizing plate for the linearly polarized light forming an angle of approximately −5 degrees to 5 degrees with the light absorption axis of the polarizer or polarizing plate.

In Equation 1, in another example the transmittance (Tp) may be a transmittance at the point of representing the maximum value when transmittances are measured in a state that two sheets of polarizers or polarizing plates are overlapped, while scanning the overlapping state for each angle so that the light absorption axes of the respective polarizers or polarizing plates form an angle in a range from 0 degrees to 360 degrees, and the transmittance (Tc) may be a transmittance at the point of representing the least transmittance on scanning for each angle as above. The above-mentioned transmittance (Ts, Tc, Tp), is a value measured with respect to light of about 550 nm.

The polarizer or polarizing plate showing these transmittances and polarization degrees may be applied to the liquid crystal panel to exhibit an excellent light transmission or blocking function.

A method for preparing the above polarizer or polarizing plate is not particularly limited. For example, the polarizer or polarizing plate, in particular the polarizer or polarizing plate showing coordinates in the CIE Lab color space may be prepared by controlling absorptance for each wavelength of the polarizer included in the polarizing plate. For example, when the polarizer is prepared to have a light blocking rate for light having any one wavelength in a range of about 560 nm to about 750 nm, for example, light having a wavelength of about 700 nm, in a range of about 5.1 to 6.0, the polarizer or polarizing plate may satisfy the above described conditions 1 to 4. Here, light having any one wavelength in the range of about 560 nm to about 750 nm, for example light having a wavelength of about 700 nm may be a linearly polarized light polarized at any one angle in the range of approximately −5 degrees to 5 degrees or at any one angle in the range of approximately −3 degrees to 3 degrees with the light absorption axis of the polarizer or approximately parallel to the axis. In addition, the light blocking rate may mean, for example, an absorbance. Here, the absorbance is calculated by −log (Tc), where Tc may be the above described transmittance, that is, a transmittance at the point of representing the minimum transmittance when transmittances are measured in a state that two sheets of polarizers or polarizing plates are overlapped, while scanning the overlapping state for each angle so that the light absorption axes of the respective polarizers or polarizing plates form an angle in a range from 0 degrees to 360 degrees.

The polarizer or the polarizing plate comprising the same may represent coordinates in the above described CIE color space by forming the polarizer to represent the above described light blocking rate for any one wavelength in the above wavelength range.

A method for forming the polarizer to represent the above-mentioned light blocking rate is not particularly limited. In the manufacturing industry of polarizers the method for forming the polarizer to represent the particular light blocking rate for each wavelength is known. For example, a PVA (poly(vinyl alcohol))-based polarizer as a typical absorption type polarizer comprises a PVA film and an anisotropic material, such as a dichroic dye or iodine, adsorptively oriented on the PVA film, where it may be possible to control the light blocking rate through adjusting the ratio or type of the anisotropic absorbent material or adjusting the orientation degree of the anisotropic absorbent material.

For example, the PVA-based polarizer can be prepared by conducting on the PVA-based film the respective processes, such as swelling, dyeing, cross-linking and stretching, and going through cleaning and drying processes, where the light blocking rate can be controlled by adjusting process conditions at any one process of the above processes, or through additional processes. For example, the dyeing process can be carried out by immersing the PVA-based film in a treatment tank containing iodine and potassium iodide, where the light blocking rate in this process may be controlled via a process of adjusting a concentration of iodine or potassium iodide in the treatment tank, or further removing or replenishing at least one component of iodine and/or potassium iodide adsorbed after dyeing, and the light blocking rate may be controlled by adjusting the orientation degree of the anisotropic absorbent material (iodine, etc.) through control of a draw ratio of the stretching process together with or separately with the above process. The method of controlling the light blocking rate is just one example, and any other method may be applied, if the light blocking rate of the polarizer may be controlled in the above described range.

Accordingly, the polarizer of the present application may comprise a PVA-based film and an anisotropic absorbent material adsorptively oriented on the PVA-based film.

Here, as the PVA-based film, for example, the PVA-based film used in a conventional polarizer may be used. A material of such a PVA-based film may include PVA or its derivatives. The derivative of PVA may include polyvinyl formal or polyvinyl acetal and the like, and in addition to that, may include olefin such as ethylene or propylene, an unsaturated carboxylic acid such as acrylic acid, methacrylic acid or crotonic acid, and its alkyl ester or one modified by acrylamide and the like. The polymerization degree of PVA is typically about 100 to 10,000, or about 1000 to 10,000, and the saponification degree is about 80 mol % to 100 mol %, without being limited thereto.

The PVA-based film may be exemplified by a hydrophilic polymer film such as a partially saponified film of ethylene vinyl acetate copolymer series, or a polyene oriented film such as a dehydrated processing material of PVA or a dehydrochloric processing material of polyvinyl chloride, and the like.

In the PVA-based film, additives such as a plasticizer or a surfactant may be contained. Here, the plasticizer may be exemplified by polyols or their condensates, and the like, for example, glycerin, diglycerin, triglycerin, ethylene glycol, propylene glycol or polyethylene glycol, and the like. When such a plasticizer is used, the ratio is not particularly limited, and typically, may be up to approximately 20% by weight of the PVA-based film.

The thickness of the PVA-based film is not particularly limited and may be suitably selected within a range in which each of the optical characteristics described above can be met.

The type of the anisotropic absorbent materials that can be included in the polarizer is also not particularly limited. In the present application one capable of satisfying the optical characteristics described above can be selected appropriately among known anisotropic absorbent materials. An example of anisotropic absorbent material may be exemplified by iodine. Also, the ratio of the anisotropic absorbent material in the polarizer is not particularly limited, if it is in the range which can satisfy the optical characteristic described above, and those skilled in the art can easily set the range through a simple experiment to prediction.

The PVA-based film may be at least subjected to a dyeing process, a cross-linking process and a stretching process to prepare such a polarizer. In the dyeing process, the cross-linking process and the stretching process, each treatment bath of a dye bath, a cross-linking bath and a stretching bath may be used, and in each of these treatment baths, each treatment liquid according to the respective processes may be used.

In the dyeing process, the anisotropic absorbent material such as iodine can be adsorbed and/or oriented into the PVA-based film. This dyeing process can be carried out together with the stretching process. Dyeing may be generally carried out by immersing the film in a solution comprising an anisotropic absorbent material, for example, an iodine solution. As the iodine solution, for example, an aqueous solution containing iodine ions by iodine and an iodinated compound as a solubilizing agent, and the like may be used. Here, as the iodinated compound, for example, potassium iodide, lithium iodide, sodium iodide, zinc iodide, aluminum iodide, lead iodide, copper iodide, barium iodide, calcium iodide, tin iodide, titanium iodide, or the like may be used. The concentration of iodine and/or iodide ions in the iodine solution may be adjusted such that the light blocking rate capable of satisfying the optical characteristics described above is achieved. However, a process parameter may be adjusted so that it is possible to achieve the light blocking rate even by further processes other than the dyeing process, where the concentration in the dyeing process is applied to a normal range. The iodine solution in the dyeing process typically has a temperature of 20° C. to 50° C., 25° C. to 40° C. or so, and typically has an immersion time 10 seconds to 300 seconds, or 20 seconds to 240 seconds or so, without being limited thereto. Through controlling such a concentration of the iodine solution and/or the immersion time thereof, it may be also possible to control the light blocking rate in the polarizer.

The cross-linking process which is carried out in the manufacturing process of the polarizer may be carried out using a cross-linking agent such as, for example, a boron compound. The order of such a cross-linking process is not particularly limited, and for example, the process may be in conjunction with dyeing and/or stretching processes, or may proceed separately. The cross-linking process may be performed multiple times. As the boron compound, boric acid or borax and the like can be used. The boron compound may be generally used in the form of an aqueous solution or a mixed solution of water and an organic solvent, and typically an aqueous solution of boric acid is used. The concentration of boric acid in the aqueous solution of boric acid may be selected in an appropriate range, considering the degree of cross-linking and the resulting heat resistance and the like. The aqueous solution of boric acid can also contain an iodinated compound such as potassium iodide, and the light blocking rate described above can be also controlled through controlling the concentration of such a compound, and the like.

The cross-linking process may be performed by immersing the PVA-based film in the aqueous solution of boric acid, and the like, and in this process, a treatment temperature is usually in a range of 25° C. or more, 30° C. to 85° C. or 30° C. to 60° C. or so, and a treatment time is usually 5 seconds to 800 seconds or 8 seconds to 500 seconds or so, without being limited thereto.

The stretching process is generally carried out by uniaxial stretching. This stretching may be also carried out together with the dyeing and/or cross-linking processes. The stretching method is not particularly limited, and for example, a wet type stretching manner can be applied. In such a wet type stretching method, for example, the stretching may be generally performed after dyeing, but the stretching may be performed together with cross-linking, and performed in multiple times or multiple stages.

The iodinated compound such as potassium iodide may be contained in the treatment liquid applied to the wet type stretching method, and in this process, it may be also possible to control the light blocking rate through controlling the ratio. The treatment temperature in the stretching is usually in the range of 25° C. or more, 30° C. to 85° C. or 50° C. to 70° C. or so and the treatment time is usually is 10 seconds to 800 seconds or 30 seconds to 500 seconds, without being limited thereto.

The total draw ratio in the stretching process may be adjusted in consideration of the orientation characteristic and the like, which may be on the order of 3 times to 10 times, 4 times to 8 times, or 5 times to 7 times based on the original length of the PVA-based film, but is not limited thereto. Here, when the swelling process other than the stretching process also accompanies stretching, the total draw ratio may mean a cumulative draw ratio including stretching in each process. This total draw ratio may be adjusted in an appropriate range considering orientation, and workability through stretching cut possibility of the polarizer and the like.

In the manufacturing process of the polarizer, in addition to the dyeing, cross-linking and stretching, the swelling process may be also performed before performing the above processes. It is possible to clean contaminants or antiblocking agents on the surface of the PVA-based film by swelling, whereby there is also an effect capable of reducing unevenness such as dyeing deviation.

In the swelling process, water, distilled water or pure water, and the like may be typically used. The main component of the relevant treatment liquid is water, where if necessary, an iodinated compound such as potassium iodide or an additive such as a surfactant, or an alcohol, and the like may be included in a small amount. Even in this process, it may be possible to control the light blocking rate described above through controlling the process parameters.

The treatment temperature in the swelling process is typically on the order of 20° C. to 45° C. or 20° C. to 40° C., but is not limited thereto. Since a swelling deviation may cause a dyeing deviation, the process parameters may be adjusted so that it is inhibited as much as possible to cause such a swelling deviation.

If necessary, an appropriate stretching can be carried out even in the swelling process. The draw ratio may be 6.5 times or less, 1.2 to 6.5 times, 2 times to 4 times or 2 times to 3 times based on the original length of the PVA film. The stretching in the swelling process can control to reduce the stretching in the stretching process performed after the swelling step, and control so that an elongation fracture of the film does not occur.

In the manufacturing process of the polarizer, a metal ion treatment may be performed. Such a treatment is practiced, for example, by immersing the PVA-based film in an aqueous solution containing a metal salt. Accordingly, metal ions may be contained in the polarizer, where it is also possible to control the color of the PVA-based polarizer by controlling the type and/or the ratio of metal ions. The metal ion capable of being applied may be exemplified by a metal ion of a transition metal such as cobalt, nickel, zinc, chromium, aluminum, copper, manganese or iron, and it may be also possible to control the color by selecting an appropriate type among them.

In the manufacturing process of the polarizer, a cleaning process may proceed after the dyeing, cross-linking and stretching. Such a cleaning process can be carried out by a solution of an iodine compound such as potassium iodide, where it may be also possible to control the light blocking rate described above through the concentration of an iodinated compound in the solution or the treatment time of the cleaning process, and the like. Therefore, the concentration of the iodinated compound and the treatment time into the solution may be controlled in consideration of the light blocking rate. However, the cleaning process may be also performed using water.

Such a cleaning by water and such a cleaning by a solution of an iodine compound may be also combined, and a solution combining a liquid alcohol such as methanol, ethanol, isopropyl alcohol, butanol or propanol may be also used.

After going through such a process, a drying process may be performed to prepare a polarizer. The drying step may be performed at an appropriate temperature for an appropriate time, for example, in consideration of the water content required for the polarizer, and such a condition is not particularly limited.

When the PVA-based polarizer is applied as a polarizer of the present application, the desired polarizer may be obtained through controlling the process parameters in the respective processes. However, although the details have been primarily explained in this specification through the PVA-based polarizer, an applicable polarizer in the present application is not limited to the PVA-based polarizer, and other known polarizers may also satisfy the above mentioned characteristics by controlling the light blocking rate, etc. with the known manner.

The present application also relates to a polarizing plate, where the polarizing plate may comprise at least the polarizer.

Other elements, which may be included in the polarizing plate of the present application, may be exemplified by a protective film of the polarizer, a pressure-sensitive adhesive layer, an adhesive layer, a retardation film or a low reflection layer and the like. If necessary, the overall characteristics of the polarizing plate may be adjusted through controlling the other elements, and accordingly the suitability for use in the present application may be improved. For example, it may be controlled that the required level of physical properties may be achieved by controlling the overall light blocking rate of the polarizer in a manner to include a specific pigment or dye in the protective film, the pressure-sensitive adhesive layer, the adhesive layer, the retardation film, and/or the low reflection layer.

As the protective film that may be included in the polarizing plate a film of a known material may be used. As such a material, for example, a thermoplastic resin having excellent transparency, mechanical strength, heat stability, water barrier property or isotropy and the like may be used. An example of such a resin may be exemplified by cellulose resins such as TAC (triacetyl cellulose), polyester resins, polyether sulfone resins, polysulfone resins, polycarbonate resins, polyamide resins, polyimide resins, polyolefin resins, (meth)acrylic resins, cyclic polyolefin resins such as norbornene resin, polyarylate resins, polystyrene resins, polyvinyl alcohol resins or a mixture thereof and the like. For example, the protective film may be present on one or both sides of the polarizer, where each protective film can be the same or different, if it is present on both sides. In addition, other than the film type protective film, a cured resin layer curing a thermal or light curable resin such as (meth)acryl-based, urethane-based, acrylic urethane-based, epoxy-based or silicone-based may be applied as the protective film.

The thickness of the protective film can be adjusted appropriately, and usually be adjusted in the range of 1 to 500 μm, 1 to 300 μm, 5 to 200 μm or 5 to 150 μm in view of workability such as strength or handleability, thinning and the like.

As the retardation film, a general material may be applied, and for example, a uniaxially or biaxially stretched birefringent polymer film or an oriented film of a liquid crystal polymer and the like may be applied. The thickness of the retardation film is also not particularly limited.

The above-described protective film or retardation film can be attached onto the polarizer by an adhesive or the like, where on such a protective film or the like, an easily bonding treatment such as a corona treatment, a plasma treatment, a primer treatment or a saponification treatment can be performed.

In addition, when the protective film is attached to the polarizer, a hard coat layer, a low reflection layer, an antireflection layer, an anti-sticking layer, a diffusion layer or a haze layer and the like may be present on the surface of the protective film opposite to the surface attached to the polarizer. It may be also possible to control the physical properties of the polarizer through controlling the properties of such a layer.

In addition to the above protective film or retardation film, various elements such as, for example, a reflective plate or a semi-transmissive plate may be also present, and the type is not particularly limited.

The adhesive may be used for bonding the polarizer and the protective film, and the like. The adhesive may be exemplified by isocyanate-based adhesives, polyvinyl alcohol-based adhesives, gelatin-based adhesives, vinyl-based, latex-based or water-based polyester and the like, without being limited thereto. As the adhesive, a water-based adhesive may be typically used, but according to the type of films to be attached a solventless type light curable adhesive may be also used.

The polarizing plate may comprise a pressure-sensitive adhesive layer for adhesion with other members such as a liquid crystal panel. The pressure-sensitive adhesive forming the pressure-sensitive adhesive layer is not particularly limited, and for example, one comprising as a base polymer an acrylic polymer, a silicone polymer, polyester, polyurethane, polyamide, polyether, or a polymer such as fluorine-based or rubber-based may be appropriately selected and used. It may be practiced in an appropriate manner for the pressure-sensitive adhesive layer to be attached to and formed on one or both sides of the polarizing plate, and the manner is not particularly limited.

For the exposed surface of the pressure-sensitive adhesive layer, a release film may be temporarily attached and covered with the purpose of preventing the contamination for up to providing a practical application.

The polarizer, the protective film, the pressure-sensitive adhesive layer, or the like, included in the polarizing plate may be given with an ultraviolet absorption capability. Such a ultraviolet absorption ability, for example, can be implemented by including an ultraviolet absorber in an appropriate ratio in each element. As the ultraviolet absorber, salicylic acid ester-based compounds or benzophenone-based compounds, benzotriazole-based compounds or cyanoacrylate-based compounds, or nickel complex salt-based compounds, etc. may be used, without being limited thereto.

The present application also relates to a display device. The display device may comprise at least the polarizer or polarizing plate. In one example the display device may comprise a liquid crystal panel and the polaraiser or polarizing plate disposed on one side of the liquid crystal panel. At this time, the polarizer or polarizing plate may be included as an upper polarizer or polarizing plate, that is, a visual side polarizer or polarizing plate. Here, the liquid crystal panel may comprise an upper substrate and a lower substrate, and a liquid crystal layer between the upper substrate and the lower substrate. At this time, the liquid crystal panel may be the above-described highly reflective liquid crystal panel, for example, a liquid crystal panel without BM. In addition, the liquid crystal panel may be a liquid crystal panel that both a TFT and a color filter are present on the lower substrate side. In the structure the polarizer or polarizing plate can improve the disadvantages of the liquid crystal panel, for example, reflection visibility characteristics in the black state, while maintaining or maximizing its advantages.

In one example the display device may comprise an additional polarizer or polarizing plate (hereinafter, referred to as a second polarizer or a second polarizing plate). For example, the above-described polarizer or polarizing plate (hereinafter, referred to as a first polarizer or a first polarizing plate) of the present application may be disposed on the upper side of the liquid crystal panel, that is, the visible side, and the second polarizer or the second polarizing plate may be disposed on the lower side, that is, the back side or the light source side. In this case, the second polarizer or the second polarizing plate may be, for example, one controlled to have a light blocking rate (light absorption rate or light reflectance) of 4 to 6 or so at any one wavelength in a range of 380 nm to 420 nm. Here, the light blocking rate may be, for example, the same concept as the above-mentioned absorbance. The method for adjusting the light blocking rate of the second polarizing plate or the second polarizer as above is not particularly limited and a known manner may be applied. When the first polarizer or the first polarizing plate of the present application is applied as the upper polarizer or polarizing plate of the above-described highly reflective liquid crystal panel, display characteristics in the black state and the light state may be greatly improved, if the optical characteristics of the second polarizing plate or the second polarizer are controlled as above.

The specific structure of the highly reflective liquid crystal panel is not particularly limited. For example, the liquid crystal panel may have the same structure as the known liquid crystal panel, except that the BM is not included, and in this case the color filter may be also present on either substrate side of the upper and lower substrates, but appropriately may be present on the lower substrate side. Also, the type of liquid crystal layers included in the liquid crystal panel is not particularly limited, and for example, all the known mode liquid crystal layers such as VA, IPS, TN or STN may be applied.

Advantageous Effects

The present application may provide a polarizer or polarizing plate showing excellent properties by being applied to various types of display devices, especially display devices comprising a highly reflective liquid crystal panel. Also, the present application may provide a display device comprising the polarizer or polarizing plate.

BRIEF DESCRIPTION OF DRAWINGS

FIGS. 1 to 9 are drawings showing transmittance of each polarizer sample prepared in Examples for each wavelength.

FIG. 10 is a drawing showing the difference in reflectance of a general panel and a high reflection panel.

FIG. 11 is a drawing showing reflectance of the cases in which a polarizer is applied to a general panel and a high reflection panel.

MODE FOR INVENTION

Hereinafter, the polarizer and the like will be described in more detail through Examples according to the present application, but the scope of the present application is not limited to the following.

Here, each physical property of the polarizer was measured in the following manner.

1. Measurement of Physical Properties

In the following Examples, transmittance, polarization degrees, CIE color coordinates, etc, were measured with respect to the polarizers themselves using a JASCO V-7100 Spectrophotometer according to the manufacturer's manual.

Preparation of Polarizer Samples

PVA films having an average polymerization degree of about 2400 and a thickness of about 60 μm as disk films were subjected to the following swelling, dyeing, cross-linking, stretching and cleaning processes to prepare polarizer samples. In the processes, process parameters, for example, concentrations of iodine or iodine ion in a treatment liquid or treatment times into the treatment liquid were adjusted for each sample so that characteristics as shown in Table 1 below were realized. The swelling was performed by using pure water as the treatment liquid and immersing the PVA film in the swelling bath for an appropriate time. In addition, the dyeing process was performed by immersing the PVA film in a dye solution controlling concentrations of iodine and potassium iodide at an appropriate temperature for an appropriate time, where the PVA film was stretched in an appropriate range. The cross-linking process was performed by immersing the PVA film in an aqueous solution comprising boric acid and potassium iodide as a treatment liquid of a cross-linking bath in an appropriate ratio and stretching it in a predetermined range, and the stretching process was also performed in a treatment liquid comprising boric acid and potassium iodide in a predetermined concentration as a treatment liquid of a stretching bath. Subsequently, samples were prepared via the cleaning process using an aqueous solution comprising potassium iodide in a predetermined ratio and a drying process as a treatment liquid of a cleaning bath. The characteristics of each sample are as follows.

TABLE 1

|   | Ts (%) | Tc (%) | P (%) | CIE-single | | | CIE-crossed | |
|---|---|---|---|---|---|---|---|---|
|   |   |   |   | −a | b | C index | $a_c$ | $b_c$ |
| 1 | 41.95 | 0.0085 | 99.9751 | 0.55 | 0.53 | 0.96 | 15.22 | −27.40 |
| 2 | 42.41 | 0.0058 | 99.9832 | 1.34 | 2.00 | 1.49 | 4.87 | −10.09 |
| 3 | 41.59 | 0.0013 | 99.9960 | 1.65 | 2.47 | 1.50 | 1.68 | −3.37 |
| 4 | 42.35 | 0.0033 | 99.9903 | 1.50 | 2.35 | 1.56 | 2.88 | −6.24 |
| 5 | 41.77 | 0.0012 | 99.9966 | 1.66 | 2.64 | 1.59 | 1.42 | −2.92 |
| 6 | 42.33 | 0.0031 | 99.9910 | 1.52 | 2.47 | 1.63 | 2.55 | −5.59 |
| 7 | 42.23 | 0.0007 | 99.9979 | 1.71 | 3.39 | 1.98 | 0.32 | −0.70 |
| 8 | 42.13 | 0.0006 | 99.9984 | 1.63 | 4.10 | 2.51 | 0.05 | −0.02 |
| 9 | 41.93 | 0.0006 | 99.9983 | 1.61 | 4.54 | 2.82 | 0.01 | 0.05 |

Ts: Transmittance for non-polarized light (measuring wavelength: 550 nm)
Tc: Transmittance for light polarized parallel to light absorption axis of the PVA polarizer (measuring wavelength: 550 nm)
P: Polarization degree (measuring wavelength: 550 nm)
CIE-single (−a, b): Color space coordinate measured for a sheet of PVA polarizer (measuring wavelength: 550 nm)
CIE-crossed ($a_c$, $b_c$): Color space coordinate measured in a state that mutual light absorption axes in two sheets of PVA polarizers are crossed by 90 degrees (measuring wavelength: 550 nm)

FIGS. 1 to 9 are transmittance (Tc) for each wavelength measured for Samples 1 to 9, respectively, which show transmittance for each wavelength measured using a linearly polarized light polarized parallel to the light absorption axis of the polarizer. As shown in FIGS. 1 to 9, it can be confirmed that in the case of Samples 1 to 7 (Examples 1 to 7, respectively), they show a tendency in which the transmittance (Tc) increases, as wavelengths become shorter on the basis of around 500 nm, and the transmittance (Tc) increases, as wavelengths become longer on the basis of wavelengths of around 700 nm as well. It can be seen from these results that in the case of the polarizers of Samples 1 to 7, they can effectively block the light leakage in which the feeling of color can be biased to red through yellow in the black state, even if applied to highly reflective liquid crystal panels. In addition, it can be seen from drawings that in the case of Samples 1, 2, 4 and 6, the above effects are superior to the other samples. However, in the case of Samples 8 and 9, it can be seen that the same tendency as Samples 1 to 7 is not confirmed.

Test Example

The optical characteristics according to application of polarizers were compared using a general liquid crystal panel (reflectance is about 10.6% for light having a wavelength of 550 nm) and a highly reflective liquid crystal panel (reflectance is about 18.18% for light having a wavelength of 550 nm) as a liquid crystal panel. FIG. 10 is a drawing showing reflection characteristics of the general panel and the highly reflective liquid crystal panel (HRL). As shown in the drawing, the highly reflective liquid crystal panel (HRL panel) shows high reflectance over the general liquid crystal panel.

The attached FIG. 11 is a drawing showing reflectance of the cases in which a polarizer is applied to the upper sides of the above general panel and highly reflective liquid crystal panel.

In the drawing, the case (A) showing the lowest reflectance at a wavelength of 700 nm is the case of applying a conventional polarizer to the general panel, the case (B) showing the upper reflectance is the case of applying the polarizer of Sample 4, on which a low reflection layer is formed, to the highly reflective liquid crystal panel, the case (C) showing the upper reflectance is the case of applying the polarizer of Sample 4 to the highly reflective liquid crystal panel without treating the low reflection layer, and the case (D) showing the upper reflectance is the case of applying a general polarizer to the high reflection panel. It can be confirmed from the drawing that the reflectance can be highly reduced by applying the polarizer according to the present application to the highly reflective liquid crystal panel and the effect can be further increased if additional treatments such as low reflection treatment are added.

The invention claimed is:

1. A polarizing plate comprising a polarizer which has a light absorption axis formed in one direction and satisfies the following conditions 1 to 4:
    Condition 1: −a value is 0.7 or more and 1.6 or less in CIE Lab color space;
    Condition 2: b value is 4 or less in CIE Lab color space;
    Condition 3: a ratio (−b/a) of −a value and b value is 2.5 or less in CIE Lab color space;
    Condition 4: $-b_c$ value is 4 to 40 in CIE Lab color space,
    wherein −a value and b value are color space coordinate measured for a sheet of PVA polarizer at a wavelength of 550 nm, and $-b_c$ value is a value multiplying $b_c$ value by −1 in color space coordinate measured in state that mutual light absorption axes in two sheets of PVA polarizers are crossed by 90 degrees at a wavelength of 550 nm.

2. The polarizing plate according to claim 1, being applied to a liquid crystal panel which has a reflectance of 12% or more for light having a wavelength of 550 nm.

3. The polarizing plate according to claim 2, wherein the liquid crystal panel is a liquid crystal panel without black matrix or a liquid crystal panel that a color filter is not present on an upper substrate, but present on a lower substrate.

4. The polarizing plate according to claim 1, comprising a polarizer which has a polarization degree of 99.9% or more.

5. The polarizing plate according to claim 1, comprising a polarizer which has a light blocking rate in a range of 5.1 to 6.0 for light having any one wavelength in a range of 560 nm to about 750 nm.

6. The polarizing plate according to claim 1, wherein the polarizer comprises a PVA-based film and an anisotropic absorbent material adsorptively oriented on the PVA-based film.

7. The polarizing plate according to claim 6, wherein the anisotropic absorbent material is iodine.

8. The polarizing plate according to claim 1, further comprising a polarizer protective film, a pressure-sensitive adhesive layer, an adhesive layer, a retardation film or a low reflection layer.

9. A display device comprising the polarizing plate of claim 1.

10. The display device according to claim 9, further comprising a liquid crystal panel having a reflectance of 12% or more for light having a wavelength of 550 nm, wherein the polarizing plate is disposed on the visible side of said liquid crystal panel.

11. The display device according to claim 10, further comprising a second polarizer or a second polarizing plate disposed on the back side of the liquid crystal panel.

12. The display device according to claim 11, wherein the second polarizer or the second polarizing plate has a light blocking rate in a range of 4 to 6 at any one wavelength in a range of 380 nm to 520 nm.

13. The display device according to claim 9, further comprising a liquid crystal panel without black matrix or a liquid crystal panel that a color filter is not present on an upper substrate, but present on a lower substrate, wherein the polarizing plate is disposed on the visible side of said liquid crystal panel.

\* \* \* \* \*